(12) United States Patent
Kawakami et al.

(10) Patent No.: US 10,950,862 B2
(45) Date of Patent: *Mar. 16, 2021

(54) METHOD FOR PRODUCING CATHODE, AND METHOD FOR PRODUCING OXIDE SOLID-STATE BATTERY

(71) Applicant: TOYOTA JIDOSHA KABUSHIKI KAISHA, Toyota (JP)

(72) Inventors: Masatsugu Kawakami, Shizuoka-ken (JP); Shingo Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

This patent is subject to a terminal disclaimer.

(21) Appl. No.: 15/837,119

(22) Filed: Dec. 11, 2017

(65) Prior Publication Data

US 2018/0212246 A1 Jul. 26, 2018

(30) Foreign Application Priority Data

Jan. 25, 2017 (JP) .............................. JP2017-011557

(51) Int. Cl.
*H01M 4/62* (2006.01)
*H01M 4/1391* (2010.01)
(Continued)

(52) U.S. Cl.
CPC ........... *H01M 4/62* (2013.01); *H01M 4/0471* (2013.01); *H01M 4/131* (2013.01); *H01M 4/1391* (2013.01); *H01M 4/525* (2013.01); *H01M 10/052* (2013.01); *H01M 10/0562* (2013.01); *H01M 10/0585* (2013.01); *H01M 2004/028* (2013.01); *H01M 2300/0071* (2013.01)

(58) Field of Classification Search
CPC ...... H01M 4/62; H01M 4/0471; H01M 4/131; H01M 4/525; H01M 10/052; H01M 10/0562; H01M 10/0585
See application file for complete search history.

(56) References Cited

U.S. PATENT DOCUMENTS

2002/0141937 A1* 10/2002 Howard, Jr. .......... H01M 4/131
423/599
2007/0248883 A1 10/2007 Oda et al.
(Continued)

FOREIGN PATENT DOCUMENTS

CN 102770391 A 11/2012
CN 104541401 A 4/2015
(Continued)

OTHER PUBLICATIONS

U.S. Appl. No. 15/894,389, filed Feb. 12, 2018, US20180277827.
(Continued)

*Primary Examiner* — Alex B Efta
(74) *Attorney, Agent, or Firm* — Sughrue Mion, PLLC (57) ABSTRACT

A method for producing a cathode that can lower a sintering temperature is provided. The method comprises: acid-treating particles of a lithium containing composite oxide that has a layered rock-salt structure; obtaining a mixture by mixing the acid-treated particles with a lithium salt whose melting point is lower than that of the lithium containing composite oxide; and heating and sintering the mixture.

11 Claims, 8 Drawing Sheets

(51) Int. Cl.
*H01M 4/131* (2010.01)
*H01M 4/525* (2010.01)
*H01M 4/04* (2006.01)
*H01M 4/02* (2006.01)
*H01M 10/052* (2010.01)
*H01M 10/0562* (2010.01)
*H01M 10/0525* (2010.01)
*H01M 10/0585* (2010.01)

(56) References Cited

U.S. PATENT DOCUMENTS

| | | | |
|---|---|---|---|
| 2009/0092903 A1 | 4/2009 | Johnson et al. | |
| 2011/0177397 A1 | 7/2011 | Ogasa | |
| 2012/0015234 A1 | 1/2012 | Iwaya et al. | |
| 2012/0305391 A1 | 12/2012 | Kim et al. | |
| 2013/0247363 A1 | 9/2013 | Nelson et al. | |
| 2013/0252085 A1 | 9/2013 | Nelson et al. | |
| 2014/0060723 A1* | 3/2014 | Herle | H01M 10/052 156/89.12 |
| 2016/0104886 A1* | 4/2016 | Tsunozaki | H01M 4/505 29/623.1 |
| 2017/0179521 A1 | 6/2017 | Sakamoto et al. | |
| 2018/0277827 A1 | 9/2018 | Kawakami et al. | |
| 2018/0331361 A1 | 11/2018 | Nelson et al. | |
| 2019/0103603 A1* | 4/2019 | Kawakami | H01M 4/62 |

FOREIGN PATENT DOCUMENTS

| | | |
|---|---|---|
| CN | 105378986 A | 3/2016 |
| JP | 2010-140664 A | 6/2010 |
| JP | 2011150817 A | 8/2011 |
| JP | 2012146443 A | 8/2012 |
| JP | 2012169066 A | 9/2012 |
| WO | 2011/086649 A1 | 7/2011 |
| WO | 2014036090 A1 | 3/2014 |

OTHER PUBLICATIONS

Communication dated Jul. 10, 2020 from the U.S. Patent and Trademark Office in U.S. Appl. No. 16/127,445.
Communication dated Dec. 10, 2020 from the U.S. Patent and Trademark Office in U.S. Appl. No. 16/127,445.

* cited by examiner

METHOD FOR PRODUCING CATHODE, AND METHOD FOR PRODUCING OXIDE SOLID-STATE BATTERY

FIELD

The present application discloses a method for producing a cathode, and a method for producing an oxide solid-state battery.

BACKGROUND

It is considered that in an oxide solid-state battery that uses a solid oxide as an electrolyte, interface resistance between a cathode and an oxide solid electrolyte layer, interface resistance between the oxide solid electrolyte layer and an anode, and so on can be reduced by joining the cathode, oxide solid electrolyte layer, and anode by sintering. On the other hand, in a solid-state battery whose layer cannot be joined by sintering, such as a sulfide solid-state battery using a sulfide solid electrolyte that is easy to suffer heat deterioration, the battery is pressurized using a restraining member, thereby contact interfaces of battery material are increased, to reduce interface resistance in the present circumstances. That is, an advantage of an oxide solid-state battery is that any member for restraining a cathode, oxide solid electrolyte layer, and anode are not necessary, and energy density of a battery as a whole can be easily increased, compared with other types of solid-state batteries.

A lithium containing composite oxide having a layered rock-salt structure can be applied as cathode active material for oxide solid-state batteries. Sintering particles of such a composite oxide makes it possible to compose a cathode of an oxide solid-state battery. In this point, Patent Literature 1 discloses a method of filling a powder of $LiCoO_2$ which has a layered rock-salt structure into a mold, reducing a pressure inside the mold, and applying pressure sintering to the $LiCoO_2$ powder at a temperature of equal to or higher than 800° C. and equal to or lower than 880° C. Patent Literature 2 discloses a method of mixing and molding a Li-containing oxide having a layered rock-salt structure, and an additive containing La and Zr, and heating and sintering a molded body at 750 to 950° C.

CITATION LIST

Patent Literature

Patent Literature 1: WO2011/086649A1
Patent Literature 2: JP2010-140664A

SUMMARY

Technical Problem

The inventors of the present application attempted to join a cathode and an oxide solid electrolyte layer by sintering, using the techniques of Patent Literatures 1 and 2, upon producing an oxide solid-state battery. Specifically, they attempted to sinter composite oxide particles each other, oxide solid electrolyte particles each other, and composite oxide particles and oxide solid electrolyte particles at the same time, by layering, and heating a layer of lithium containing composite oxide particles having layered rock-salt structures, and a layer of oxide solid electrolyte particles while pressurizing the same.

Heating at high temperature as disclosed in Patent Literatures 1 and 2 is necessary for sintering lithium containing composite oxide particles having layered rock-salt structures. The inventors of the present application newly found that when composite oxide particles are attempted to be sintered at such high temperature, sometimes, composite oxide particles chemically react with oxide solid electrolyte particles before the composite oxide particles are sintered, and a high resistance layer forms over particle interfaces. That is, it was found that a sintering temperature of a cathode has to be as low as possible for producing an oxide solid-state battery by sintering the cathode and an oxide solid electrolyte layer. If a sintering temperature of a cathode can be lowered, it is advantageous in view of energy efficiency as well.

As described above, the present application discloses a method for producing a cathode that can lower a sintering temperature, and a method for producing an oxide solid-state battery that uses the cathode.

Solution to Problem

The present application discloses a method for producing a cathode, the method comprising: acid-treating particles of a lithium containing composite oxide that has a layered rock-salt structure; obtaining a mixture by mixing the acid-treated particles with a lithium salt whose melting point is lower than that of the lithium containing composite oxide; and heating and sintering the mixture, as one means for solving the above problem.

"Particles of a lithium containing composite oxide that has a layered rock-salt structure" are particles (powder) of a composite oxide that contain lithium as an element forming a layered rock-salt crystal structure. When these particles are subjected to X ray diffraction, diffraction peaks corresponding to a layered rock-salt crystal structure is confirmed.

"Acid-treating" means a process of making the above described particles be in contact with an acid, to change properties of the surface of the particles. An acid here has only to contain a hydrogen ion, and may be either an organic or inorganic acid.

"Lithium salt" means a salt of a lithium ion and an anion. The lithium ion has only to have a melting point lower than that of the above described lithium containing composite oxide.

"Mixing the acid-treated particles with a lithium salt" may be either dry mixing of solids with each other, or wet mixing using a solvent.

"Mixture" has only to contain at least the acid-treated particles as described above, and the lithium salt, and may contain optional components such as conductive material if necessary.

In the producing method of the present disclosure, the lithium salt is preferably at least one kind selected from the group consisting of lithium nitrate, lithium formate, and lithium acetate.

In the producing method of the present disclosure, the lithium salt is preferably a mixture of lithium formate and lithium acetate as well.

In the producing method of the present disclosure, in said sintering the mixture, the mixture is preferably heated either while or after pressurized.

The present application discloses a method for producing an oxide solid-state battery, the method comprising: acid-treating particles of a lithium containing composite oxide that has a layered rock-salt structure; obtaining a mixture by mixing the acid-treated particles with a lithium salt whose melting point is lower than that of the lithium containing composite oxide; obtaining a layered body by layering a layer that comprises the mixture, and a layer of an oxide solid electrolyte; and heating the layered body at a temperature of no less than the melting point of the lithium salt, and lower than reaction temperature of the mixture with the oxide solid electrolyte, and sintering the mixture on a surface of the layer of the oxide solid electrolyte, as one means for solving the above problem.

"Layer of an oxide solid electrolyte layer" is a layer having lithium ion conductivity due to an oxide solid electrolyte.

"Oxide solid-state battery" is a battery including a cathode, an anode, and an oxide solid electrolyte layer that is arranged between the cathode and the anode.

Specifically preferably, the oxide solid electrolyte contains garnet type lithium lanthanum zirconate, and a temperature at which the layered body is heated is no less than the melting point of the lithium salt, and lower than 600° C.

Advantageous Effects

In the method for producing a cathode according to the present disclosure, lithium containing composite oxide particles having layered rock-salt structures are heated along with a lithium salt after acid-treated. Here, the melting point of the lithium salt is lower than that of the above described lithium containing composite oxide. In addition, it is considered that diffusibility of lithium on the surface of the particles is increased by the acid treatment. It is considered that whereby, lithium from the lithium salt is efficiently diffused over the surface of the particles, which promotes sintering. From the above, according to the method for producing a cathode of the present application, lithium containing composite oxide particles each other can be sintered at low temperature via a lithium salt, or using a lithium salt as a flux.

From the reason same as the above, lithium containing composite oxide particles and another material can be sintered at low temperature as well. That is, when an oxide solid-state battery is produced using the method for producing a cathode of the present disclosure, lithium containing composite oxide particles can be sintered with an oxide solid electrolyte layer at low temperature, and a cathode and the oxide solid electrolyte layer can be joined at low temperature.

DETAILED DESCRIPTION OF EMBODIMENTS

1. Method for Producing Cathode

Figure 1:
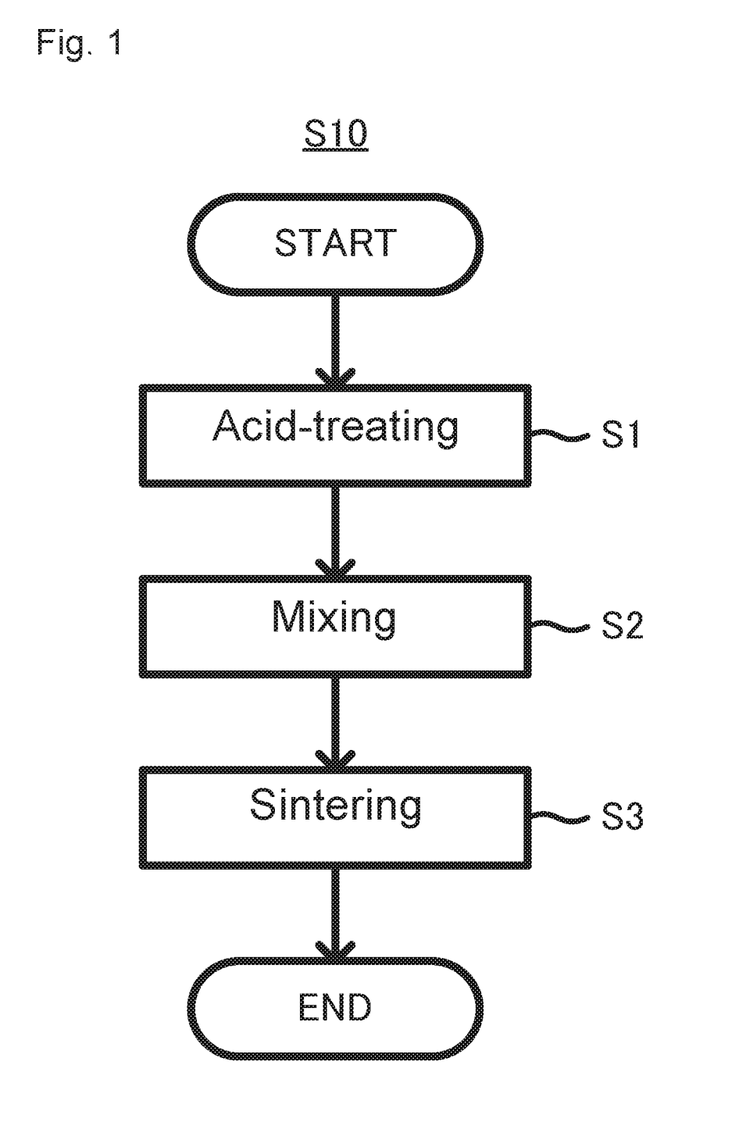
FIG. 1 is an explanatory flowchart of a method for producing a cathode S10.
Figure 2A:
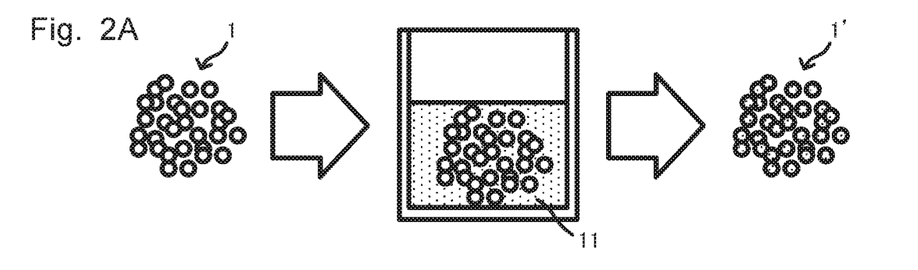
FIGS. 2A to 2C are explanatory views of the flow of the method for producing a cathode S10.
Figure 2B:
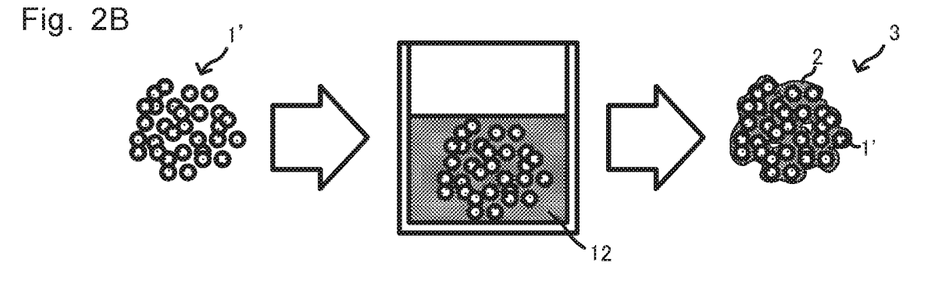
Figure 2C:
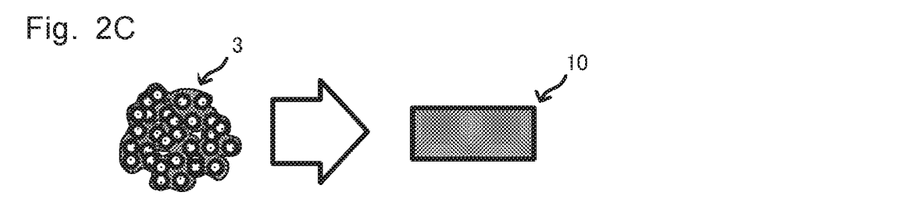

FIGS. 1 to 2C show the flow of the method for producing a cathode S10. The producing method S10 comprises: acid-treating particles 1 of a lithium containing composite oxide that has a layered rock-salt structure S1; obtaining a mixture 3 by mixing the acid-treated particles 1' with a lithium salt 2 whose melting point is lower than that of the lithium containing composite oxide S2; and heating and sintering the mixture 3 S3.

1.1. Step S1

As shown in FIG. 2A, in the step S1, the particles 1 of a lithium containing composite oxide that has a layered rock-salt structure are acid-treated.

The lithium containing composite oxide having a layered rock-salt structure functions as cathode active material for oxide solid-state batteries. Specific examples of such a composite oxide include lithium cobaltate, lithium nickelate, lithium nickel cobalt manganese oxide (layered rock-salt lithium oxide composed of manganese, cobalt, nickel, aluminum, etc.). The lithium containing composite oxide having a layered rock-salt structure may include a crystal phase different from a layered rock-salt crystal phase as long as effect of low temperature sintering is not ruined. Examples of such a crystal phase include a spinel crystal phase. The lithium containing composite oxide of a single phase which only contains a layered rock-salt crystal phase as a crystal phase is preferable in view of further improving battery performance.

A particle diameter of the particle of a lithium containing composite oxide having a layered rock-salt structure 1 is not restricted. The diameter is usually 0.1 µm to 0.1 mm although depending on the shape of a cathode to be produced by sintering.

The acid treatment has only to change properties of the surface of the above particles 1 by an acid. For example, as shown in FIG. 2A, the acid treatment can be carried out by making a liquid 11 that contains hydrogen ions to be in contact with the particles 1. A type of the acid used for the acid treatment is not restricted. The acid has only to contain hydrogen ions. The acid may be inorganic acids such as hydrochloric acid, nitric acid, and sulfuric acid, and may be organic acids such as acetic acid, formic acid, and oxalic acid. Contacting time for the acid with the particles 1 in the acid treatment is not restricted as well. Any length of time may be taken therefor as long as the acid-treated particles of a lithium containing composite oxide 1' can keep their particulate shapes. According to a finding of the inventors of the present application, even if the particles of a lithium containing composite oxide 1 are acid-treated, a layered rock-salt structure as a crystal structure is kept.

It is considered that in the step S1, diffusibility of lithium over the surface of the particles 1 is increased by the acid treatment of the particles 1. Whereby, it is considered that in the step S3 described later, lithium from the lithium salt 2 is efficiently diffused over the surface of the particles 1', to promote sintering. Thus, a sintering temperature further lowers.

1.2. Step S2

As shown in FIG. 2B, in the step S2, the mixture 3 is obtained by mixing the acid-treated particles 1' with the lithium salt 2 whose melting point is lower than that of the lithium containing composite oxide.

The lithium salt is a salt of a lithium ion and an anion. The lithium ion has only to have a melting point lower than that of the above lithium containing composite oxide. The lithium salt preferably has a melting point lower than 600° C., more preferably no more than 400° C., further preferably no more than 300° C., and especially preferably no more than 250° C. Preferred examples of the lithium salt include at least one kind of lithium salt selected from the group consisting of lithium nitrate, lithium formate, and lithium acetate.

The melting point of the lithium salt lowers by mixing at least two kinds of lithium salts. For example, the melting point of a mixture of lithium formate and lithium acetate is lower than that of lithium formate only or that of lithium acetate only. Thus, the lithium salt is preferably a mixture of at least two kinds of lithium salts in view of further lowering the sintering temperature in S3 described later. In this case, the mixing ratio of different kinds of lithium salts in the mixture is not restricted. The mixing ratio has only to be a ratio that can make the melting point as low as possible. For example, when the mixture of lithium formate and lithium acetate is used as the lithium salt, it is preferable that the molar ratio of the lithium formate to lithium acetate (lithium formate/lithium acetate) in the mixture be 1/3 to 3. In this case, the melting point of the lithium salt lowers to, for example, no more than 250° C.

In the step S2, mixing of the particles 1' and the lithium salt 2 may be either dry mixing of solids with each other, or wet mixing using a solvent or the like. In either case, the particles 1' and the lithium salt 2 can be mixed by a known mixing method. Specifically, wet mixing using a solvent or the like is preferable because the lithium salt 2 can be more uniformly arranged around the particles 1'. For example, as shown in FIG. 2B, the lithium salt is dissolved in water, to be an aqueous solution 12, the particles 1' are immersed in the aqueous solution 12, and then moisture is evaporated by heating, thereby the mixture 3 composed of the particles 1', and the lithium salt 2 arranged around the particles 1' is obtained.

In the step S2, the mixing ratio between the particles 1' and the lithium salt 2 is not restricted. The amount of the lithium salt 2 is preferably increased as much as possible in view of lowering the sintering temperature. On the other hand, the amount of the particles 1' is preferably increased as much as possible in view of securing high lithium ion conductivity and electronic conductivity. The mixing ratio between the particles 1' and the lithium salt 2 may be determined according to the performance of a cathode to be aimed. For a guideline, the amount of the lithium salt 2 is 1 part by mass to 100 parts by mass, to 100 parts by mass of the particles 1'.

While in the step S2, at least the particles 1' and the lithium salt 2 have only to be mixed, conductive material and so on may be optionally mixed thereto as far as the sintering temperature, or performance of a cathode is badly influenced. Examples of conductive material include carbon material and metallic material. It is considered that conductive material makes it possible to improve electronic conductivity of a cathode. It is noted that a cathode obtained by the producing method S10 has high density, and has high electronic conductivity without including conductive material. That is, according to the producing method S10, the proportion of cathode active material (lithium containing composite oxide) in a cathode 10 can be relatively high, and cathode capacity can be increased.

1.3. Step S3

As shown in FIG. 2C, in the step S3, the mixture 3 obtained in the step S2 is heated and sintered. Whereby, the cathode 10 can be produced.

The step S3 can be carried out using known heating means. A heating temperature in S3 has only to be a temperature of no less than the melting point of the lithium salt 2 described above. On the other hand, the heating temperature is preferably as low as possible in view of suppressing chemical reaction upon joining with another battery material, and in view of energy efficiency. Specifically, heating is preferably carried out at a temperature lower than 600° C., more preferably no more than 400° C., further preferably no more than 300° C., and especially preferably no more than 250° C., depending on the melting point of the lithium salt though.

According to a new finding of the inventors of the present application, an acid-treated layered rock-salt lithium containing composite oxide might decompose partially at high temperature. For example, acid-treated lithium cobaltate decomposes at 250° C. or higher, to form cobalt oxide with release of oxygen. Even if cobalt oxide forms, sintering itself can be completed without any problem, and the cathode can be produced as the above described problem is solved. However, cobalt oxide is inactive in electrochemical reaction, and does not contribute to charge-discharge reaction of batteries. Thus, it is better to reduce the amount of cobalt oxide in the cathode as much as possible. The heating temperature in the step S3 is preferably as low as possible also in such a view. It is effective to use a lithium salt of a melting point as low as possible, as the lithium salt in order to sinter the mixture 3 at further low temperature in the step S3. For example, as described above, the lithium salt can have a lower melting point by using a mixture of at least two kinds of lithium salts as the lithium salt. Specifically, when lithium formate and lithium acetate are mixed, the melting point becomes lower than 250° C., which is preferable.

A heating atmosphere in the step S3 has only to an atmosphere under which the mixture 3 can be sintered without the mixture 3 caused to unnecessarily react.

Examples of an atmosphere under which sintering can be carried out include various atmospheres such as oxygen-containing atmospheres (an air atmosphere, the atmosphere, etc.), and inert gas atmospheres.

In the step S3, an apparent volume of the mixture 3 is gradually becoming small as the mixture 3 is being sintered. Here, there is a case where air bubbles and the like inside do not completely come out in sintering, and voids remain inside the cathode. Preferably, the mixture 3 is heated while pressurized, or the mixture 3 is heated after pressurized in the step S3 in order to suppress generation of these voids and obtain a cathode of much higher density. Specifically, the mixture is preferably heated while pressurized. In S3, when the mixture is pressurized, force of the pressure is not restricted, and for example, is preferably 0.1 MPa to 1000 MPa. Means for pressurizing the mixture is not restricted. For example, the mixture can be heated while pressurized by using a die or the like made of material that does not react with the above described mixture substantially, and can bear heating in the step S3.

As described above, in the producing method S10, after acid-treated, the particles of a layered rock-salt lithium composite oxide 1 are heated along with the lithium salt 2, whereby the lithium composite oxide particles each other can be sintered at low temperature via the lithium salt 2 or using the lithium salt 2 as a flux.

2. Method for Producing Oxide Solid-State Battery

Figure 3:
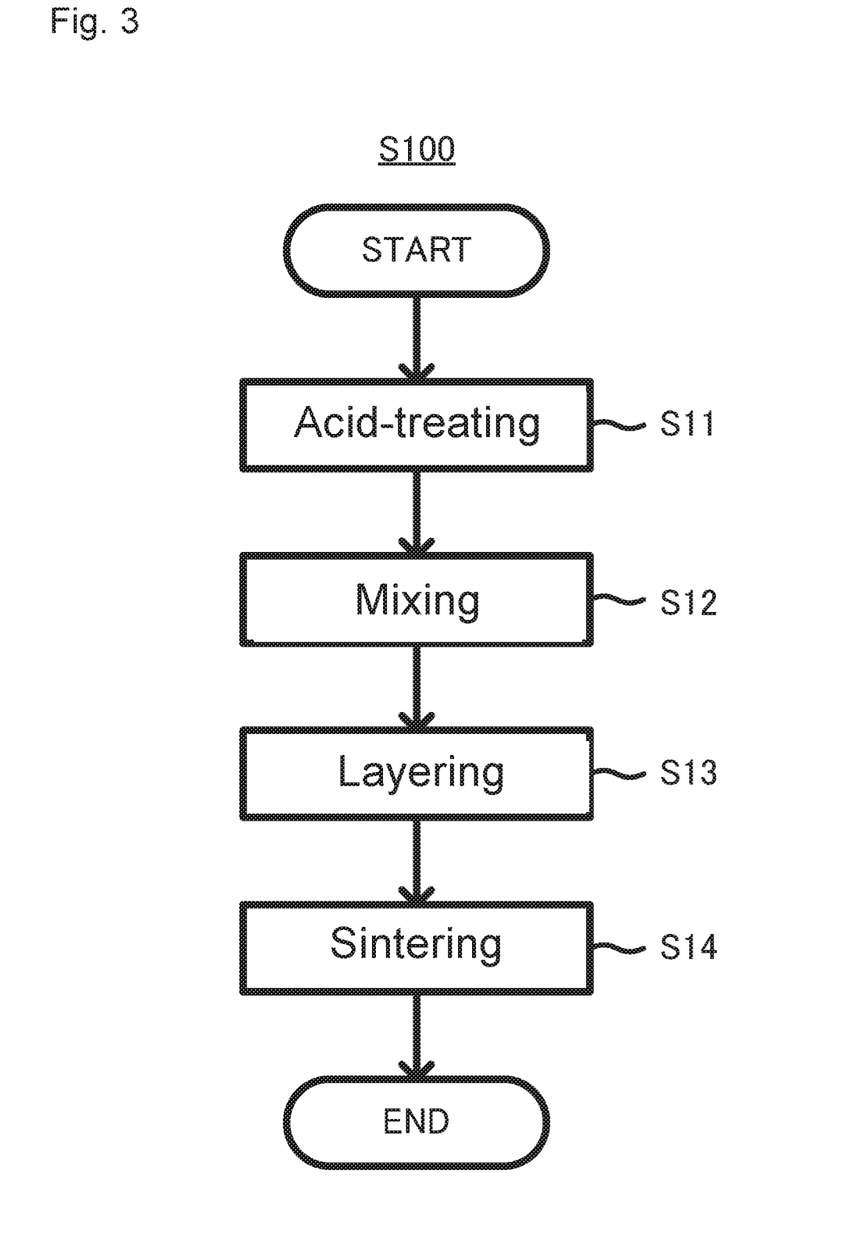
FIG. 3 is an explanatory flowchart of a method for producing an oxide solid-state battery S100.
Figure 4A:
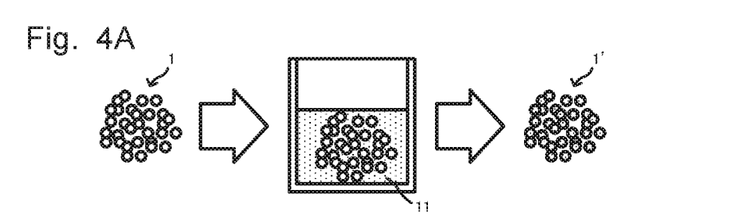
FIGS. 4A to 4D are explanatory views of the flow of the method for producing the oxide solid-state battery S100.
Figure 4B:
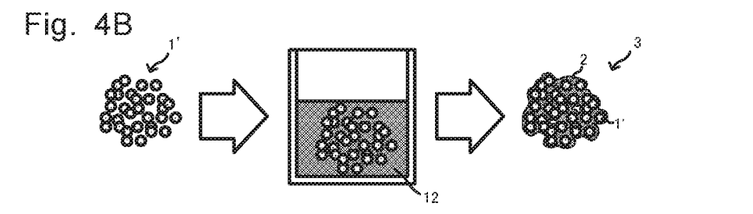
Figure 4C:
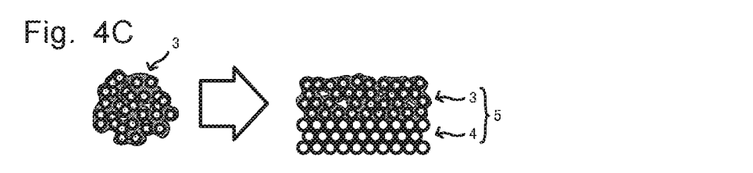
Figure 4D:
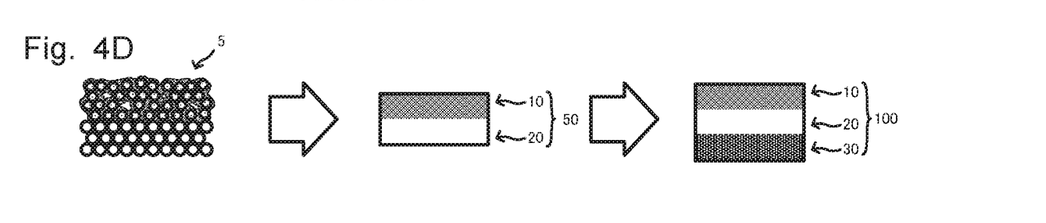

FIGS. 3 to 4D show a method for producing an oxide solid-state battery S100. The producing method S100 includes: acid-treating the particles 1 of a lithium containing composite oxide that has a layered rock-salt structure S11; obtaining a mixture by mixing the acid-treated particles 1' with the lithium salt 2 whose melting point is lower than that of the lithium containing composite oxide S12; obtaining a layered body 5 by layering a layer that comprises the mixture 3, and a layer of an oxide solid electrolyte 4; and heating the layered body 5 at a temperature of no less than the melting point of the lithium salt 2, and lower than reaction temperature of the mixture 3 with the oxide solid electrolyte, and sintering the mixture 3 on a surface of the layer of the oxide solid electrolyte 4.

2.1. Steps S11 and S12

As shown in FIGS. 4A and 4B, the step S11 and step S12 are same as the above described step S1 and step S2. Description thereof is omitted here.

2.2. Step S13

As shown in FIG. 4C, in the step S13, a layer composed of the mixture 3, and the oxide solid electrolyte layer 4 are layered, to obtain the layered body 5.

For example, the oxide solid electrolyte layer 4 in the step S13 may be an accumulating layer of particles of an oxide solid electrolyte, or a sintered layer of an oxide solid electrolyte. Preferably, as shown in FIG. 4C, the oxide solid electrolyte layer 4 is an accumulating layer of oxide solid electrolyte particles. The size of an oxide solid electrolyte particle in this case is not restricted. The size is usually 0.1 μm to 0.1 mm. When the layer 4 is an accumulating layer of oxide solid electrolyte particles, sintering the oxide solid electrolyte particles, and sintering the mixture 3 with the oxide solid electrolyte particles simultaneously progress at the same time when the mixture 3 is sintered in the step S14 described later. Whereby, the cathode 10 can be more firmly joined with an oxide solid electrolyte layer 20 after sintering (FIG. 4D).

Any solid oxide that has lithium ion conductivity and can be used as an electrolyte for oxide solid-state batteries can be employed as an oxide solid electrolyte that constitutes the oxide solid electrolyte layer 4. Examples thereof include garnet type oxides such as lithium lanthanum zirconate, perovskite type oxides such as lithium lanthanum titanate, and NASICON type oxides such as $Li_{1+y}Al_yTi_{2-y}(PO_4)_3$ (0≤y≤1). Among them, garnet type lithium lanthanum zirconate is preferable in view of high lithium ion conductivity, and obtaining further remarkable effect according to the method of the present disclosure.

In the step S13, for example, the layered body 5 can be made by: arranging the oxide solid electrolyte particles in a mold in a layered state, to be the oxide solid electrolyte layer 4; and placing the mixture 3 on the surface of the layer 4 in a layered state. In the layered body 5, the thickness of the layer consisting of the mixture 3, and the thickness of the oxide solid electrolyte layer 4 are not restricted. The thicknesses may be properly determined according to the performance of a battery to be aimed. The layered body 5 may be press-formed.

2.3. Step S14

As shown in FIG. 4D, in the step S14, the layered body 5 is heated at the melting point of the lithium salt 2 or higher, and a temperature lower than the reaction temperature of the mixture 3 with the oxide solid electrolyte, to sinter the mixture 3 on the surface of the oxide solid electrolyte layer 4. Whereby, a joining body 50 of the cathode 10 and the oxide solid electrolyte layer 20 is obtained. An anode 30 is provided with this joining body 50 (including the case where anode material is joined at the same time when the layer consisting of the mixture 3, and the oxide solid electrolyte layer 4 are sintered in the step S14, as described later), thereby the oxide solid-state battery 100 can be produced.

The step S14 can be carried out using known heating means. A heating temperature in the step S14 has only to be the above described melting point of the lithium salt 2 or higher, and lower than the reaction temperature of the mixture 3 with the oxide solid electrolyte. The heating temperature is preferably as low as possible in view of energy efficiency, and suppressing decomposition of the acid-treated particles 1. Specifically, heating is preferably carried out at a temperature lower than 600° C., more preferably no more than 400° C., further preferably no more than 300° C., and especially preferably no more than 250° C.

According to a new finding of the inventors of the present application, when an oxide solid electrolyte contains garnet type lithium lanthanum zirconate, there might be a case where a layered rock-salt lithium containing composite oxide reacts with the oxide solid electrolyte at 600° C. or higher, to form a high resistance layer. Therefore, in this case, it is preferable that the temperature at which the layered body 5 is heated be no less than the melting point of the lithium salt 2, and lower than 600° C.

2.4. Anode

The anode 30 provided with the oxide solid-state battery 100 has only to contain anode active material. Examples that can be employed as the anode active material include silicon, and lithium. Silicon is preferable because being able to make the battery have higher capacity.

In the producing method S100, the anode 30 has only to be joined with the surface of the oxide solid electrolyte layer 20 of the joining body 50 (surface opposite to the cathode 10). The method of joining the anode 30 is not restricted. For example, anode material is deposited on the surface of the oxide solid electrolyte layer 20, whereby the anode 30 can be joined with the surface of the oxide solid electrolyte layer 20. Or, anode material is layered on the surface of the oxide solid electrolyte layer 4 or the oxide solid electrolyte layer 20, and heated, whereby the oxide solid electrolyte layer 20 can be joined with the anode 30.

Figure 5:
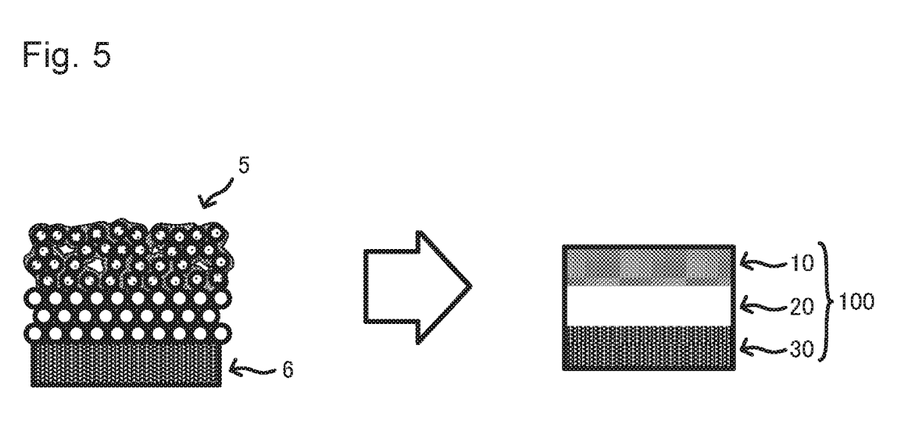
FIG. 5 is an explanatory view of an example of a method for joining an anode.

When the anode 30 is joined with the oxide solid electrolyte layer 20 by heating, as shown in FIG. 5, anode material 6 is preferably joined with the oxide solid electrolyte layer 4 in the above described step S14. That is, preferably, the mixture 3, the oxide solid electrolyte, and the anode material 6 are integrally calcined, and simultaneously sintered. According to a finding of the inventors of the present application, when silicon is used as anode active material, and an oxide solid electrolyte contains garnet type lithium lanthanum zirconate, there might be a case where silicone reacts with the oxide solid electrolyte at 600° C. or higher, to form a high resistance layer. Therefore, in this case, it is proposed that the heating temperature in the step S14 be lower than 600° C.

2.5. Other Components

The oxide solid-state battery 100 is provided with collectors, terminals, and so on properly. Methods for placing them themselves are publicly known, and thus, description thereof is omitted here.

As described above, in the producing method S100, after acid-treated, the layered rock-salt lithium composite oxide particles 1 are heated along with the lithium salt 2, whereby the lithium composite oxide particles 1 and another material can be sintered at low temperature. That is, in the producing method S100, the oxide solid-state battery is produced using the above described producing method S10, whereby the lithium composite oxide particles can be sintered with the oxide solid electrolyte layer at low temperature, and the cathode and the oxide solid electrolyte layer can be joined at low temperature. In addition, when the anode is joined simultaneously with the cathode and the oxide solid electrolyte layer, reaction of the oxide solid electrolyte layer with the anode can be suppressed.

EXAMPLES (1) Producing Cathode According to Example

The following example shows the case where lithium cobaltate ($Li_2CoO_2$) was used as the lithium containing composite oxide having a layered rock-salt structure, and lithium nitrate ($LiNO_3$) was used as the lithium salt. The producing method of the present disclosure is not limited to this. It is obvious that the same effect can be brought even if any material other than them is used.

(1-1) Acid Treatment

Into a beaker, 500 ml of hydrochloric acid (HCl) that was adjusted to be 1 in pH was put, and 3 g of lithium cobaltate particles was added thereto. After that, the resultant was stirred using a stirrer at 500 rpm in rotation speed at 25° C. for 16 hours. After stirring was ended, the resultant liquid was filtered through filter paper, to obtain acid-treated lithium cobaltate particles.

(1-2) Mixing

Lithium nitrate was dissolved into pure water in a Petri dish. The above acid-treated lithium cobaltate particles were added to this solution, and subjected to ultrasonic dispersion. After that, the resultant was heated with a hot plate, and moisture therein was vapored, to obtain a mixture of the acid-treated lithium cobaltate particles and lithium nitrate.

(1-3) Sintering

Into a pelleting jig made by alumina ($Al_2O_3$) of 11.28 mm in diameter (1 cm$^2$), 500 mg of the above mixture was put (here, the mixture was inserted in the following order: carbon (C) sheet/gold (Au) sheet/mixture/gold (Au) sheet/carbon (C) sheet), and heated while pressurized with a die made by stainless steel (SUS304) under the conditions at 100 MPa in pressure under an argon atmosphere at 400° C. for 8 hours, to sinter the mixture to obtain a cathode for evaluation.

(2) Producing Cathode According to Comparative Example

A cathode was obtained in the same way as the example except that lithium cobaltate particles without acid treatment were used as they were.

(3) Producing Cathode According to Reference Example

A cathode was obtained in the same way as the comparative example except that only lithium cobaltate particles were heated while pressurized without mixing with lithium nitrate. Sintering did not progress at all in the obtained cathode. Thus, electronic conductivity could not be evaluated. It was found that it is effective to mix layered rock-salt lithium containing composite oxide particles with a lithium salt having a melting point lower than that of the oxide particles for sintering a cathode at low temperature.

(4) Evaluation of Electronic Conductivity

Voltages of 0.02, 0.01, −0.01, and −0.02 V were applied to the cathodes according to the example and comparative example under the temperature environments of 10, 20, 25, 40, and 60° C. Currents then were measured, resistance was calculated, and electronic conductivity was evaluated. The results are shown in FIG. 6.

Figure 6:
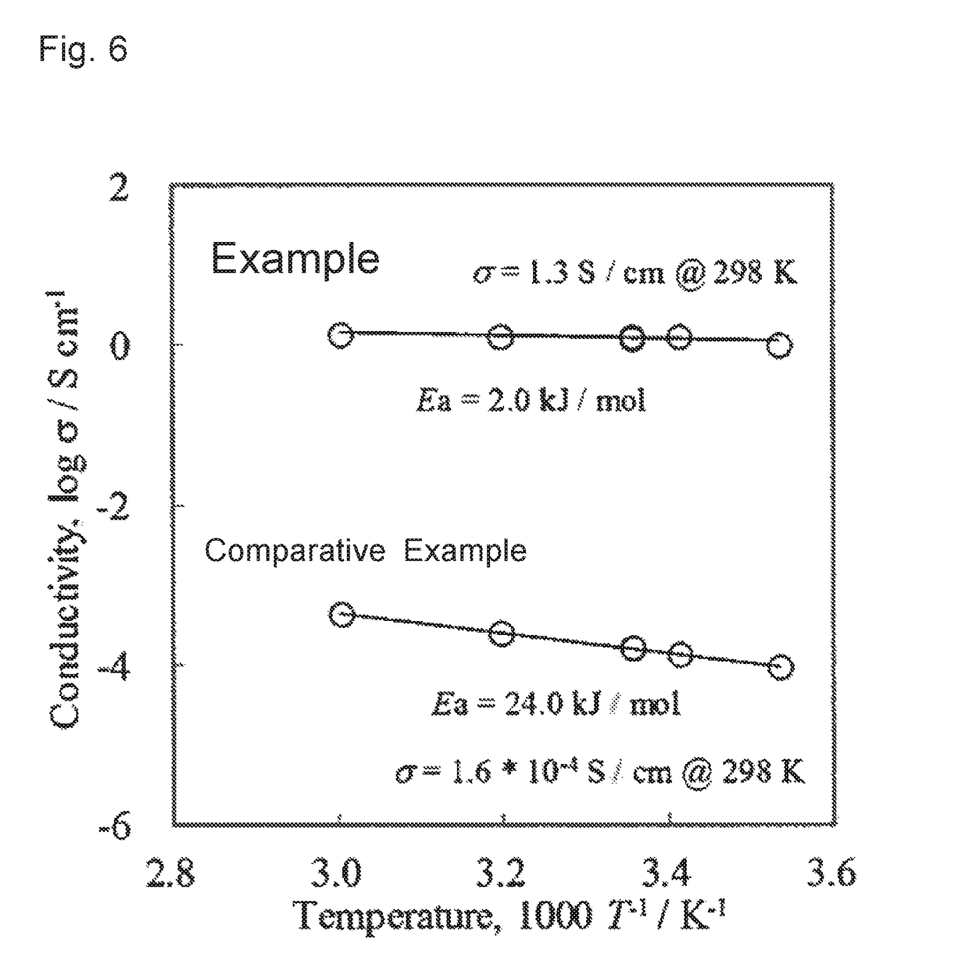
FIG. 6 is a comparative graph of electronic conductivity for a cathode according to Example 1 and that according to Comparative Example 1.

As is clear in FIG. 6, electronic conductivity of the cathode according to the example largely increased compared to that according to the comparative example. It is considered that properties of the surface of the lithium cobaltate particles were changed by the acid treatment, and diffusibility of lithium ions over the surface increased. It is also considered that whereby, lithium from lithium nitrate was efficiently diffused over the surface of the lithium cobaltate particles, to promote sintering. As described above, it was found that it is effective to acid-treat layered rock-salt lithium containing composite oxide particles for further lowering a sintering temperature of a cathode.

(5) Producing Oxide Solid-State Battery According to Example

The following example shows the case where lithium cobaltate was used as the lithium containing composite oxide having a layered rock-salt structure, lithium nitrate was used as the lithium salt, garnet type lithium lanthanum zirconate ($Li_7La_3Zr_2O_{12}$) was used as the oxide solid electrolyte, and lithium metal was used as the anode. The producing method of the present disclosure is not limited to this. It is obvious that the same effect can be brought even if any material other than them is used.

(5-1) Acid Treatment and Mixing

A mixture was obtained in the same way as the above (1-1) and (1-2).

(5-2) Layering and Sintering

Into a pelleting jig made by alumina ($Al_2O_3$) of 11.28 mm in diameter (1 cm$^2$), 450 mg of lithium lanthanum zirconate particles was put, and shaped with a die made by stainless steel (SUS304) at 100 MPa in pressure, to obtain an oxide solid electrolyte layer. On the surface of the oxide solid electrolyte layer in the jig, 18.9 mg of the mixture was layered, and heated while pressurized with a die made by stainless steel (SUS304) under the conditions at 100 MPa in pressure under an argon atmosphere at 400° C. for 8 hours, to obtain a joining body of a cathode and the oxide solid electrolyte layer. Here, the structure of the layers was as the following order: carbon (C) sheet/gold (Au) sheet/oxide solid electrolyte layer/cathode layer/gold (Au) sheet/carbon (C) sheet.

(5-3) Joining Anode

The carbon sheet and the gold sheet in the oxide solid electrolyte layer side of the obtained joining body were removed by grinding, and lithium was deposited on the surface of the exposed oxide solid electrolyte layer, and joined as the anode, to obtain an oxide solid-state battery for evaluation.

(6) Producing Oxide Solid-State Battery According to Comparative Example

An oxide solid-state battery was obtained in the same way as the example except that lithium cobaltate particles without acid treatment were used as they were.

(7) Charge Discharge Measurement

Figure 7A:
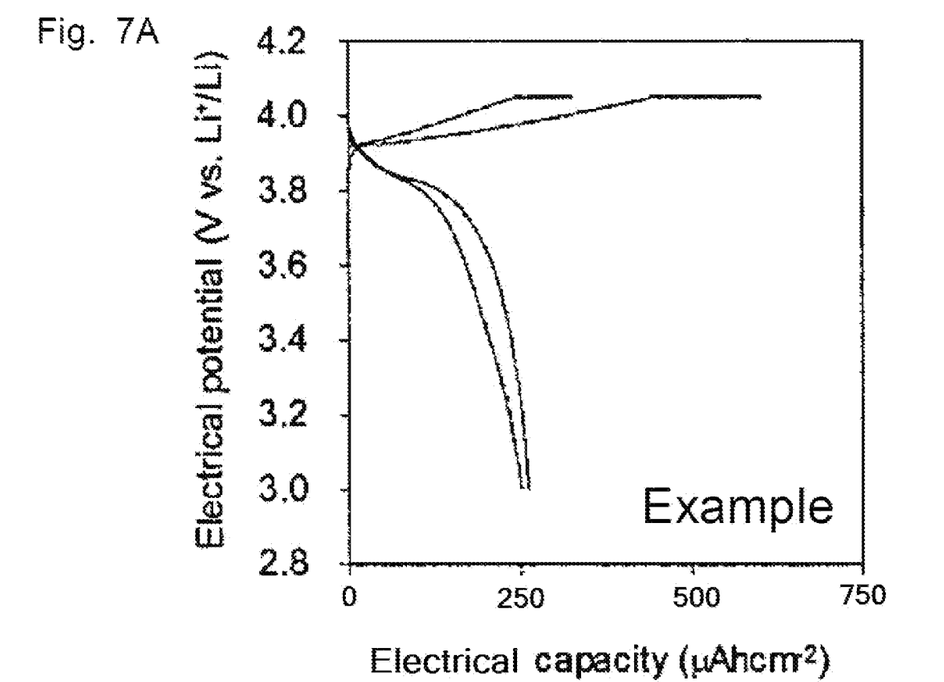
FIGS. 7A and 7B are graphs showing charge and discharge curves for a battery according to Example 1 and that according to Comparative Example 1.

The batteries according to the example and comparative example were charged to 4.05 V under the temperature environment at 60° C. at 0.02 mA, thereafter discharged to 3 V at 0.02 mA. FIG. 7A shows charge-discharge curves of the battery according to the example, and FIG. 7B shows charge-discharge curves of the battery according to the comparative example.

Figure 7B:
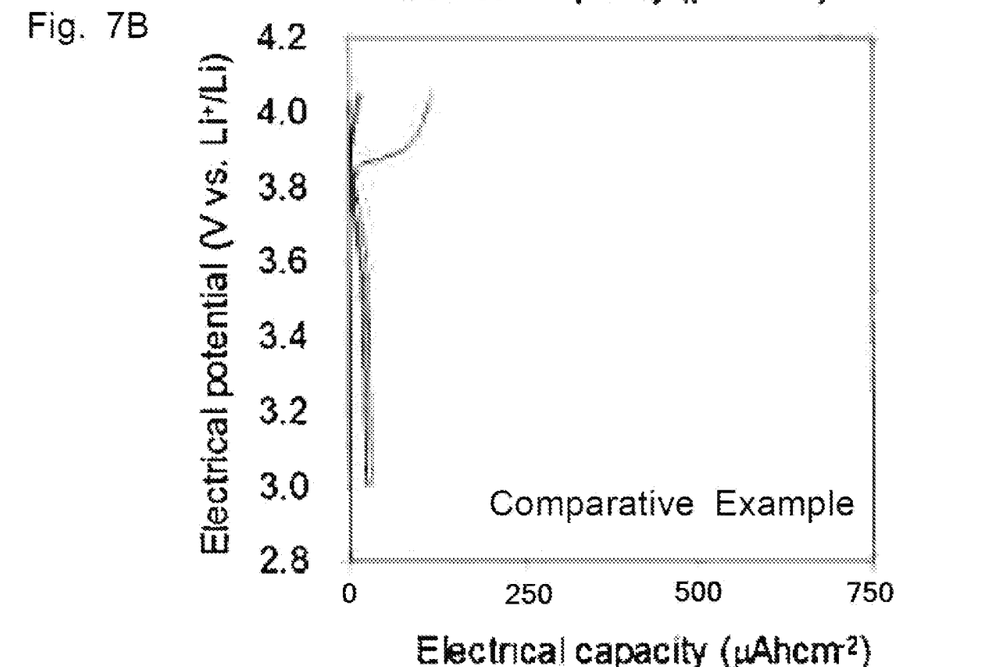

As is clear from FIGS. 7A and 7B, battery capacity of the battery according to the example largely increased compared to that according to the comparative example. It is considered that the cathode was properly sintered at low temperature, whereby the interface resistance of the cathode and the oxide solid electrolyte layer decreased.

(8) Study on Melting Point of Lithium Salt

Lithium formate monohydrate ($HCOOLi \cdot H_2O$), and lithium acetate dehydrate ($CH_3COOLi \cdot 2H_2O$) were weighed so as to have a predetermined molar ratio, and mixed in a mortar, to obtain a mixture.

Figure 8:
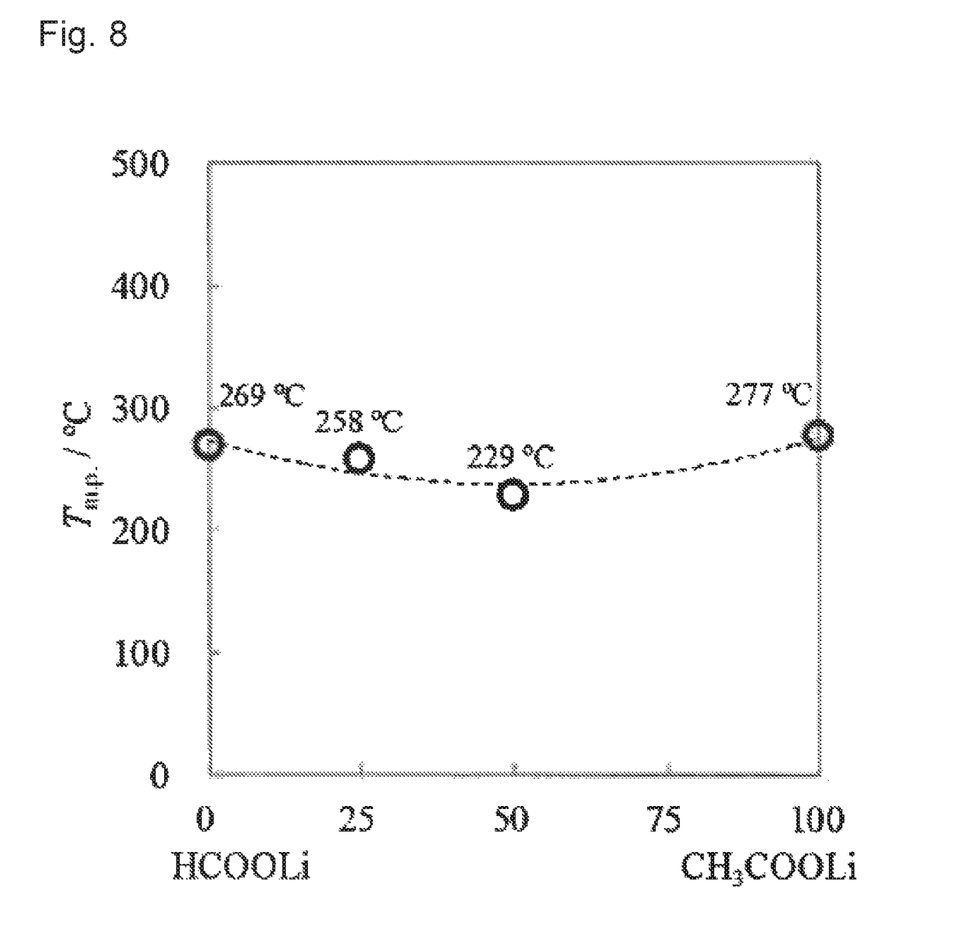
FIG. 8 is a graph showing the relationship between mixing ratios (molar ratios) between lithium formate and lithium acetate, and melting points.

In a TG-DSC/DTA device (manufactured by Rigaku Corporation), approximately 10 mg of the above mixture was put on a measurement pan made by platinum (Pt), and changes in weight of the mixture, and the presence or not of exothermic and endothermic peaks were confirmed by raising a temperature to 900° C. under the conditions at 20° C./min in heating rate under a helium atmosphere (300 ml/min). A temperature at which the weight did not drop, and an endothermic peak was confirmed was considered as the melting point of the mixture. FIG. 8 shows the relationship between the molar ratio between lithium formate monohydrate and lithium acetate dehydrate in the mixture, and the melting point.

As is clear from FIG. 8, the melting point of the mixture of lithium formate and the lithium acetate is lower than that of lithium formate only, and that of lithium acetate only. It was found that if, for example, the molar ratio of lithium formate to lithium acetate (lithium formate/lithium acetate) is 1/3 to 3, the melting point of the lithium salt lowers to 250° C. or below. As described above, it was indicated that the melting point of the lithium salt, which is a mixture of at least two kinds of lithium salts, lowers.

INDUSTRIAL APPLICABILITY

The cathode produced by the producing method of this disclosure has high sintered density, and high electronic conductivity. Thus, the cathode can be used as a cathode for various types of batteries. The oxide solid-state battery produced by the producing method of this disclosure has high capacity, and further does not require any restraining member or the like for reducing interface resistance. Thus, energy density is also high. Therefore, for example, the oxide solid-state battery can be used as an on-board large-sized power source.

REFERENCE SIGNS LIST 1 particles of a lithium containing composite oxide having a layered rock-salt structure
2 lithium salt
3 mixture
4 oxide solid electrolyte layer
5 layered body
6 anode material
10 cathode
20 oxide solid electrolyte layer
30 anode
100 oxide solid-state battery

What is claimed is:

1. A method for producing a cathode, the method comprising:
    obtaining a lithium containing composite oxide that has a layered rock-salt structure;
    determining the melting point of the lithium containing composite oxide;
    acid-treating particles of the lithium containing composite oxide;
    obtaining a lithium salt whose melting point is lower than that of the lithium containing composite oxide;
    obtaining a mixture by mixing the acid-treated particles with the lithium salt; and
    heating and sintering the mixture,
    wherein the lithium salt is a combination of lithium formate and lithium acetate.

2. The method according to claim 1,
    wherein the lithium salt further comprises lithium nitrate.

3. The method according to claim 1,
    wherein in said sintering the mixture, the mixture is heated either while or after pressurized.

4. The method according to claim 1,
    wherein a molar ratio of the lithium formate to the lithium acetate (lithium formate/lithium acetate) in the mixture is 1/3 to 3.

5. The method according to claim 1,
    wherein an amount of the lithium salt in the mixture is 1 part by mass to 100 parts by mass per 100 parts by mass of the acid-treated particles in the mixture.

6. The method according to claim 1,
    wherein the lithium salt has a melting point lower than 250° C.

7. A method for producing an oxide solid-state battery, the method comprising:
    obtaining a lithium containing composite oxide that has a layered rock-salt structure;
    determining the melting point of the lithium containing composite oxide,
    acid-treating particles of the lithium containing composite oxide;
    obtaining a lithium salt whose melting point is lower than that of the lithium containing composite oxide;
    obtaining a mixture by mixing the acid-treated particles with the lithium salt;
    obtaining a layered body by layering a layer that comprises the mixture, and a layer of an oxide solid electrolyte;
    determining a reaction temperature at which the mixture reacts with the oxide solid electrolyte;
    selecting a heating temperature that is greater than or equal to the melting point of the lithium salt and lower than the reaction temperature; and
    heating the layered body at the temperature, and sintering the mixture on a surface of the layer of the oxide solid electrolyte,
    wherein the lithium salt is a combination of lithium formate and lithium acetate.

8. The method according to claim 7, wherein
    the oxide solid electrolyte contains garnet type lithium lanthanum zirconate, and
    the heating temperature is no less than the melting point of the lithium salt, and lower than 600° C.

9. The method according to claim 7,
    wherein a molar ratio of the lithium formate to the lithium acetate (lithium formate/lithium acetate) in the mixture is 1/3 to 3.

10. The method according to claim 7,
    wherein an amount of the lithium salt in the mixture is 1 part by mass to 100 parts by mass per 100 parts by mass of the acid-treated particles in the mixture.

11. The method according to claim 7,
    wherein the lithium salt has a melting point lower than 250° C.

* * * * *